(12) United States Patent
Webb

(10) Patent No.: US 10,145,306 B2
(45) Date of Patent: Dec. 4, 2018

(54) HEAT SHIELD FOR GAS TURBINE ENGINE GEARBOX

(71) Applicant: UNITED TECHNOLOGIES CORPORATION, Farmington, CT (US)

(72) Inventor: Timothy Webb, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 484 days.

(21) Appl. No.: 14/761,539

(22) PCT Filed: Jan. 16, 2013

(86) PCT No.: PCT/US2013/021659
§ 371 (c)(1),
(2) Date: Jul. 16, 2015

(87) PCT Pub. No.: WO2014/112988
PCT Pub. Date: Jul. 24, 2014

(65) Prior Publication Data
US 2015/0361898 A1 Dec. 17, 2015

(51) Int. Cl.
*F02C 7/24* (2006.01)
*F16H 57/04* (2010.01)
*F02C 7/32* (2006.01)

(52) U.S. Cl.
CPC .................. *F02C 7/24* (2013.01); *F02C 7/32* (2013.01); *F16H 57/0419* (2013.01);
(Continued)

(58) Field of Classification Search
CPC .......... F16H 57/0419; F02C 7/24; F02C 7/32; F02C 7/36; F05D 2260/231;
(Continued)

(56) References Cited

U.S. PATENT DOCUMENTS 4,442,585 A * 4/1984 McGehee, Sr. ........ F16L 59/026
138/149
6,170,252 B1 1/2001 Van Duyn
(Continued)

FOREIGN PATENT DOCUMENTS

CN 203210184 U * 9/2013
GB 1014870 A * 12/1965 ............. F01D 5/147
(Continued)

OTHER PUBLICATIONS

Machine Translation of CN 203210184 U.*
(Continued)

*Primary Examiner* — Logan Kraft
*Assistant Examiner* — Elton Wong
(74) *Attorney, Agent, or Firm* — Cantor Colburn LLP

(57) ABSTRACT

A heat shield (44) for an external component, such as a gearbox (42), of a gas turbine engine (20) for limiting heat transfer from the engine (20) to the external component is disclosed. The heat shield (44) may be formed to the shape of the gearbox (42) to reduce the geometric envelope of the gearbox (42) and heat shield (44). The heat shield (44) may be formed by a thin thermal insulation core (50) surrounded by a metal sheet (51). The small thickness of the heat shield (44) also reduces the geometric envelope of the heat shield (44). Since no extra equipment is needed to provide cooling fluid to the gearbox (42), the heat shield (44) reduces the overall weight of the gas turbine engine (20) as well.

16 Claims, 3 Drawing Sheets

(52) U.S. Cl.
CPC .......... *F05D 2260/231* (2013.01); *F05D 2260/4031* (2013.01); *Y02T 50/671* (2013.01); *Y02T 50/675* (2013.01); *Y10T 29/49828* (2015.01)

(58) Field of Classification Search
CPC ....... F05D 2260/403; F05D 2260/4031; Y02T 50/671; Y02T 50/675; F01D 15/08; F01D 15/12; F01D 25/145; Y10T 29/49828; Y10T 29/49948; Y10T 29/49904; Y10T 29/4932
See application file for complete search history.

(56) References Cited

U.S. PATENT DOCUMENTS

| | | | | |
|---|---|---|---|---|
| 2006/0193721 A1* | 8/2006 | Adam | ................... | F01D 25/145 415/177 |
| 2009/0129967 A1* | 5/2009 | Goller | ................... | C21D 6/004 420/38 |
| 2009/0290976 A1 | 11/2009 | Suciu et al. | | |
| 2010/0180568 A1 | 7/2010 | Sachs | | |
| 2011/0239660 A1 | 10/2011 | Suciu et al. | | |
| 2012/0117981 A1 | 5/2012 | Suciu et al. | | |
| 2012/0272662 A1* | 11/2012 | Milburn | ................... | F23R 3/10 60/796 |

FOREIGN PATENT DOCUMENTS

| | | | | |
|---|---|---|---|---|
| GB | 1127659 A | * | 9/1968 | ................ F02C 7/32 |
| WO | 20140143344 A2 | | 9/2014 | |

OTHER PUBLICATIONS

International Search Report for related PCT Application No. PCT/US13/021659; report dated Sep. 10, 2013.
European Search Report for Application No. EP 13 87 1712.

* cited by examiner

HEAT SHIELD FOR GAS TURBINE ENGINE GEARBOX

CROSS-REFERENCE TO RELATED APPLICATION

This Application is a US National Stage under 35 USC § 371 of International Patent Application No. PCT/US13/21659 filed on Jan. 16, 2013.

FIELD OF THE DISCLOSURE

The present disclosure generally relates to gas turbine engines and, more specifically, to heat shields for gearboxes of gas turbine engines.

BACKGROUND OF THE DISCLOSURE

A gas turbine engine, typically used as a source of propulsion in aircraft, operates by drawing in ambient air, combusting that air with a fuel, and then forcing the exhaust from the combustion process out of the engine.

Typically, a gas turbine engine has a case surrounding the core components, such as a diffuser case surrounding a diffuser and combustor. An auxiliary gearbox is generally positioned near this diffuser case and in mechanical communication with the fan, compressor, and/or turbine. The combustor produces copious amounts of heat, some of which is transferred to the diffuser case and then transferred to the gearbox. Such heat can be detrimental to the operation and life of the gearbox. Specifically, the heat may cause any lubricant working in the gearbox to coke or components of the gearbox may be damaged due to heat stress.

In an effort to mitigate such heat related effects, cooling is typically provided to the auxiliary gearbox in the form of compressed air from the compressor, a fuel working as a coolant, or a dedicated coolant in addition to any cooling provided by a lubricant acting on the gearbox. While effective, such cooling requires extra components to communicate these fluids through the engine and, in the case of the dedicated coolant, may require additional equipment to remove heat from the coolant. These additional components and equipment increase the weight and size of the engine, as well as the maintenance needed to keep the engine operating.

Therefore, it can be seen that a need exists for a way to reduce the heat stress on the gearbox, while reducing the weight, size, and maintenance requirements of the engine.

SUMMARY OF THE DISCLOSURE

In accordance with one aspect of the disclosure, a combination of a heat shield for a gearbox of a gas turbine engine and the gearbox therefore is disclosed. The heat shield may include a bather adapted to be positioned between the gas turbine engine and the gearbox, with the barrier being complementarily shaped to the shape of the gearbox. A plurality of connectors mount the heat shield to the gearbox.

In a refinement, each connector may be welded to the barrier.

In another refinement, each connector may be bolted to the gearbox.

In another refinement, the barrier may include a body having a longitudinal axis. The heat shield may also have a first leg extending from the body in a first direction perpendicular to the longitudinal axis and forming a first angle between the body and first leg. The heat shield may further include a second leg extending from the body in a second direction opposite to the first direction and forming a second angle between the body and the second leg.

In a further refinement, the heat shield may further include a foot extending from the second leg in the second direction and forming a third angle between the second leg and the foot.

In another further refinement, the second angle may be greater than the first angle.

In another refinement, the heat shield may include a thermal insulation core and a metal sheet surrounding the thermal insulation core.

In yet another refinement, the metal sheet may be chromium nickel stainless steel.

In still another refinement, the insulation core may be low-conductivity fiber felt insulation.

In accordance with another aspect of the present disclosure, a gas turbine engine is disclosed. The engine may include a gearbox operatively associated with the engine and a heat shield formed to the shape of the gearbox. The gearbox may be mounted outside an engine core component. The heat shield may be mounted to the gearbox by a plurality of connectors between the gearbox and the engine core component.

In a refinement, the engine core component may be one of the compressor, combustor, and turbine.

In another refinement, the gas turbine engine may further include a diffuser between the compressor and the combustor and a diffuser case surrounding the diffuser and combustor. The gearbox may be positioned around the diffuser case and the heat shield may be positioned between the gearbox and diffuser case.

In a further refinement, the heat shield may include a body, a first leg extending from the body in a circumferential direction around the diffuser case, and a second leg extending from the body away from the diffuser case.

In yet a further refinement, the heat shield may further include a foot extending from the second leg away from the diffuser case.

In another refinement, each connector may be welded to the heat shield and bolted to the gearbox.

In yet another refinement, the heat shield may include a thermal insulation core and a metal sheet surrounding the thermal insulation core.

In accordance with yet another aspect of the present disclosure, a method of configuring an engine is disclosed. The method may include aligning a heat shield with a gearbox such that the shape of the heat shield is complementary with the shape of the gearbox. The method may further include mounting the heat shield to the gearbox and mounting the gearbox to the engine such that the heat shield is positioned between the gearbox and the engine.

In a refinement, the method may further include welding a plurality of connectors to the heat shield prior to mounting the heat shield to the gearbox.

In another refinement, the mounting of the heat shield to the gearbox may include bolting the heat shield to the gearbox.

In another refinement, the aligning of the heat shield with the gearbox may further include positioning the heat shield such that all surfaces of the gearbox which will face the engine are covered by the heat shield.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is therefore not limited to the particular embodiments illustrated herein.

DETAILED DESCRIPTION

Figure 1:
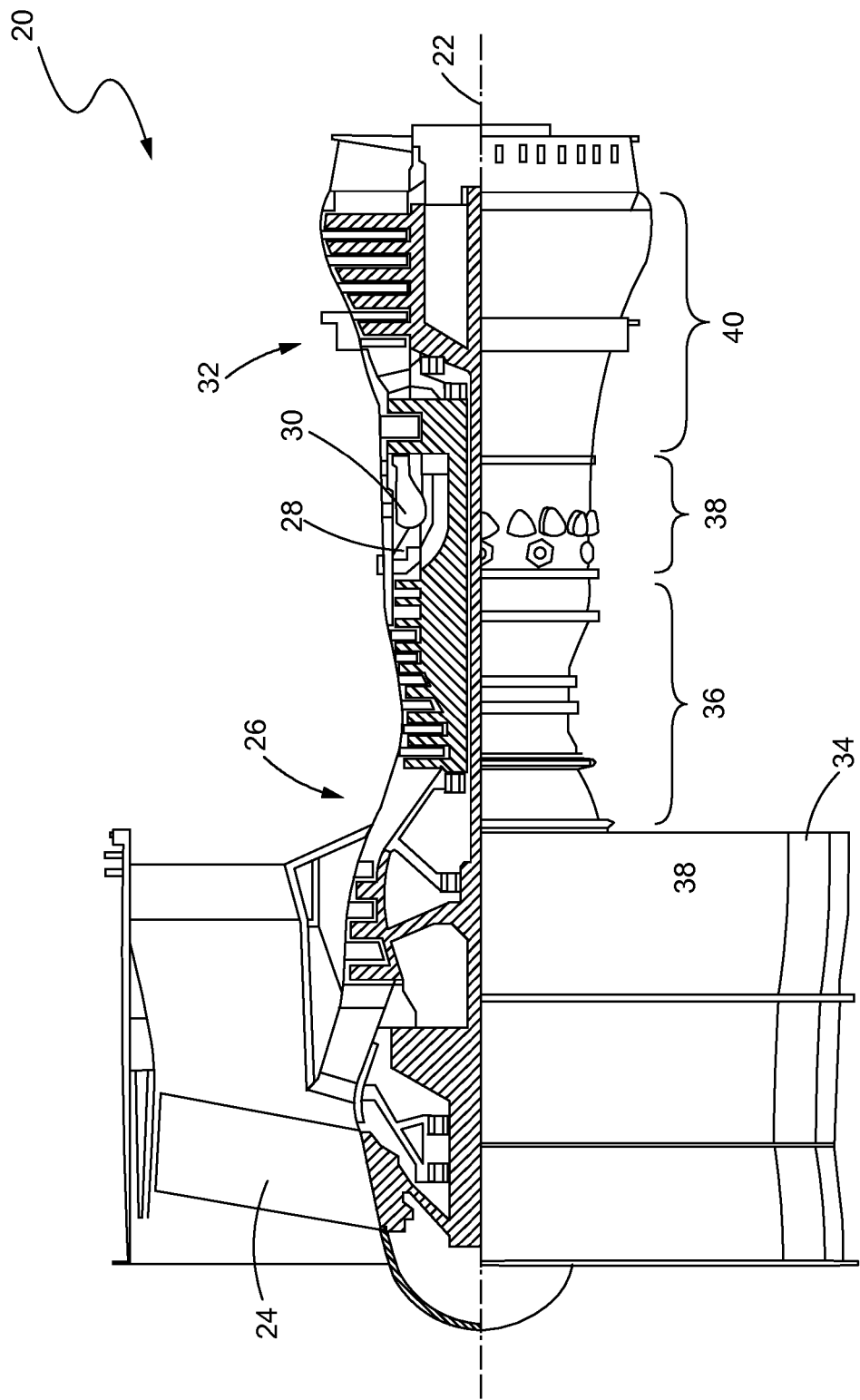
FIG. 1 is a partial cross-sectional view of a gas turbine engine constructed in accordance with an embodiment of the present disclosure and depicting a turbofan engine.

Referring now to the drawings and with specific reference to FIG. 1, a gas turbine engine is depicted and generally referred to by the numeral 20. While the engine 20 of FIG. 1 is depicted as a turbofan type of gas turbine engine for an aircraft, it should be understood that this is in no way limiting, and is only provided for ease of illustration. The teachings of the present disclosure apply to any other form of gas turbine engine as well.

The engine 20 is depicted in FIG. 1 as including a plurality of components axially aligned along central axis 22. Such components include a fan 24, a dual-spool compressor 26 downstream from the fan 24, a diffuser 28 communicating between the compressor 26 and a combustor 30 downstream from the compressor 26, and a dual-spool turbine 32 downstream from the combustor 30. As used herein, "downstream" means further along the flow of air through the engine 20. In addition, while the engine 20 of FIG. 1 is depicted as a dual-spool engine, it is to be understood that any configuration is possible, such as, but not limited to, single or triple spool configurations.

The engine 20 further includes casings surrounding the above-mentioned engine components as well as other components. Specifically, a fan case 34 surrounds the fan 24 and a portion of the compressor 26, a compressor case 36 surrounds the compressor 26, a diffuser case 38 surrounds the diffuser 28 and combustor 30, and a turbine case 40 surrounds the turbine 32. As is well known in the art, many external components of the engine 20 are mounted to the engine casings, such as, but not limited to, a fuel supply, an oil supply, or a gearbox 42. Typically, this gearbox 42 is driven by an engine shaft that mechanically transfers rotational energy from the turbine 32 to the gearbox 42. The gearbox 42 then drives the accessories of the engine 20 such as, but not limited to, a fuel pump or an oil pump.

Figure 2:
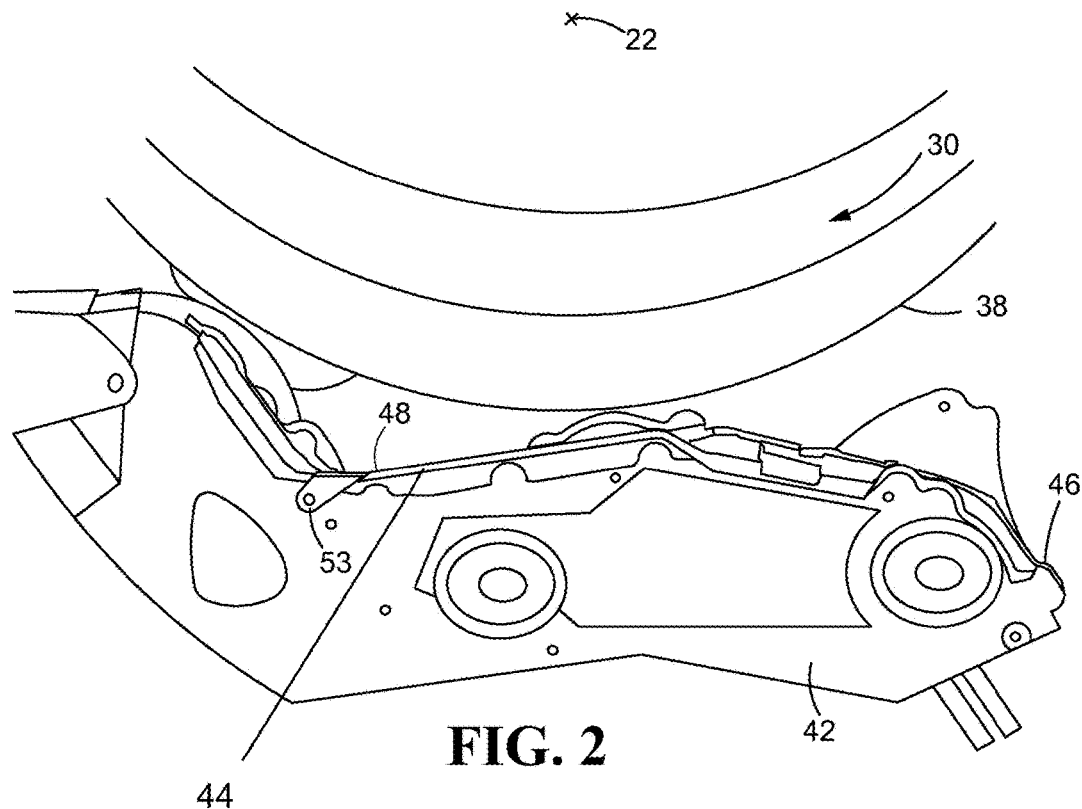
FIG. 2 is a cross-sectional view of a gas turbine engine and gearbox constructed in accordance with an embodiment of the present disclosure.

As best shown by FIG. 2, the gearbox 42 may be mounted directly to the diffuser case 38. While this is typical of gas turbine engines used in aerospace applications, the present disclosure drastically departs from the prior art by providing a heat shield 44 between the gearbox 42 and diffuser case 38. The heat shield 44 is provided to limit the amount of heat transferred to the gearbox 42 from internal engine components, such as, but not limited to, the combustor 30. Moreover, between the heat shield 44 and a lubrication system providing lubricant to the gearbox 42, there is no need for a dedicated cooling system as mentioned above, which would otherwise add to the weight and complexity of the system.

Figure 3:
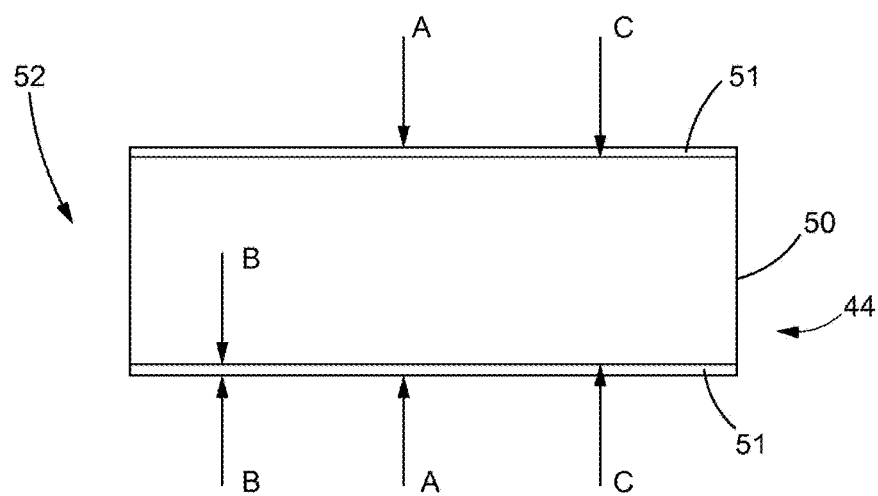
FIG. 3 is a cross-sectional view of a heat shield constructed in accordance with an embodiment of the present disclosure and detailing the material layers of the heat shield.

The heat shield 44 may consist of a thermal insulation core 50 flanked by a metal sheet 51 on both sides to collectively form a barrier 52 as shown in FIG. 3. The thermal insulation core 50 may be manufactured from many different materials including, but not limited to, low-conductivity fiber felt insulation. The insulator may be pliable or rigid. In one embodiment, the insulation used to form the core 50 can continuously withstand up to about 2000 degrees Fahrenheit. With respect to the metal sheet 51, it may be manufactured from many different metals including, but not limited to, chromium-nickel stainless steel sheet with titanium. In one embodiment, the metal sheet 51 can continuously withstand up to about 1500 degrees Fahrenheit. Examples of suitable material for the metal sheet 51 include AMS5510 and Type 321 stainless steel, although other materials are possible. The thermal insulation core 50 and metal sheet 51 may be modified to withstand other temperatures as needed by varying the density of the materials used, or by changing the materials used all together, and should not be limited by the embodiments presented herein.

The heat shield 44 may be mounted to the gearbox 42 by a plurality of connectors 53. In the embodiment presented in FIG. 2, the connectors 53 are brackets spot welded to the heat shield 44 and bolted to the gearbox 42. Specifically, the connectors 53 are welded to a hot surface 48 of the heat shield 44, which is the surface of the heat shield 44 facing the diffuser case 38. Having the heat shield 44 bolted to the gearbox 42 via the connectors 53 maintains the heat shield 44 in a fixed position, while still allowing the heat shield 44 to be removed when maintenance to the gearbox 42 is needed, or to allow the heat shield 44 to be replaced should the heat shield 44 become damaged in some way. Of course, the embodiment presented in FIG. 2 is only one mode of attaching the heat shield 44 to the gearbox 42. Other modes of attachment are also possible such as, but not limited to, welding of the connectors 53 to both the gearbox 42 and the heat shield 44.

As there is relatively little space between the gearbox 42 and the diffuser case 38, it is important that the heat shield 44 of FIG. 2 be manufactured as thinly as possible, while still providing the necessary barrier to heat transfer. For example, in one embodiment, depicted in FIG. 3, the total thickness of the heat shield 44, thickness A-A, may be up to about 0.250 inches. To accomplish this, each sheet 52 may have a thickness B-B of about 0.004 inches, while the thermal insulation core 50 may have a thickness C-C of up to about 0.241 inches. The thicknesses A-A, B-B, C-C depicted FIG. 3 are only representative of one embodiment of the present disclosure, and may each be modified provided there is sufficient space for any increased thicknesses, and any decreased thicknesses still provide the desired heat insulation.

Figure 4:
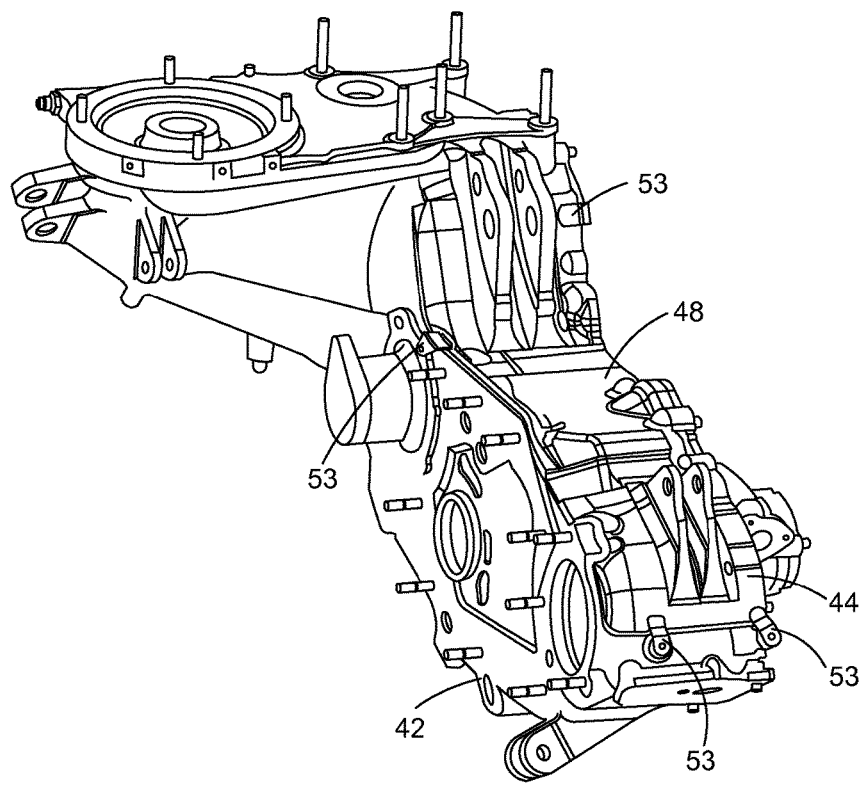
FIG. 4 is a perspective view of a gearbox and heat shield constructed in accordance with an embodiment of the present disclosure.
Figure 5:
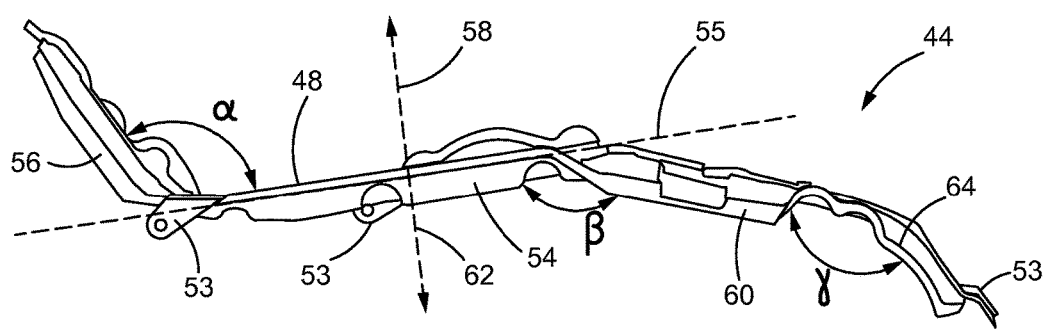
FIG. 5 is another perspective view of a heat shield constructed in accordance with an embodiment of the present disclosure.

In order to further reduce the space required for the heat shield 44, the heat shield 44 may be formed complementarily to the shape of the gearbox 42, such as in the case of the heat shield 44 of FIGS. 4 and 5. As shown, in so doing, the presented heat shield 44 protects all surfaces of the gearbox 42 which are oriented towards the diffuser case 38. Using the shape of the gearbox 42 of FIG. 4 as an example, it can be seen in FIG. 5, that the formed heat shield 44 matches the shape of the gearbox 42. As a result, the heat shield 44 may include four sections as will now be described.

As illustrated, the four sections of the heat shield 44 include a body 54 extending along a longitudinal axis 55. A second section, which is a first leg 56, extends primarily in a first direction 58 from the body to form a first angle α between the first leg 56 and the body 54. The first direction 58 is oriented substantially perpendicular to the longitudinal axis 55.

A third section, which is a second leg 60, extends from the body 54 in a second direction 62, where the second direction 62 is opposite to the first direction 58. In so doing, a second angle β is formed between the body 52 and the second leg 60. The fourth section, which is a foot 64, extends from the second leg 60 in the second direction 62 to form a third angle γ between the second leg 60 and the foot 64. As depicted in FIG. 5, all angles α, β, γ are greater than ninety degrees and the second angle β is greater than the first and third angles α, γ.

With respect to the engine 20, the body 54 of the heat shield 44 is oriented tangentially to the diffuser case 38. The first leg 56 extends from the body 53 in a circumferential direction around the diffuser case 38 and the second leg 60 extends from the body 53 away from the diffuser case 38. The foot 64 extends from the second leg 60 away from the diffuser case 38 in a radial direction with respect to the central axis 22.

The engine 20, gearbox 42, and the heat shield 44 may be configured together by first aligning the heat shield 44 with the gearbox 42. Specifically for the gearbox 42 and heat shield 44 illustrated in FIGS. 2 and 4, the heat shield 44 is aligned such that the shape of the heat shield 44 is complementary with the shape of the gearbox 42. Such an alignment of the heat shield 44 with the gearbox 42 will allow the heat shield 44 to cover all surfaces of the gearbox 42 that face the engine 20. The heat shield 44 is then mounted to the gearbox 42. This may be accomplished by bolting the heat shield 44, or bolting a plurality of connectors 53 that have been welded to the heat shield 44, to the gearbox 42. Once the heat shield 44 has been mounted to the gearbox 42, the gearbox 42 is mounted to the engine 20 such that the heat shield 44 is positioned between the gearbox 42 and the engine 20.

While the above description is one embodiment of the present disclosure, for example, setting forth one formed heat shield for one type of gearbox. Other embodiments or equivalents falling within the spirit and scope of this disclosure are included as well.

The heat shield disclosed herein has applicability in a variety of settings such as, but not limited to, reducing heat stress on external engine components of a gas turbine engine, specifically for a gearbox mounted to the diffuser case of a gas turbine engine. Such a heat shield in combination with a typical lubrication system does not require a dedicated coolant or any of the equipment associated with a dedicated coolant to cool the gearbox. Additionally, the presented heat shield does not impose upon the strict size and weight limitations to which gas turbine engines abide when utilized in conjunction with aircraft. The shield is relatively thin and may be formed to the shape of the gearbox further reducing the geometric envelope of the heat shield.

While the present disclosure has been made in reference to a gas turbine engine and an aircraft, and specifically to heat shields for gearboxes, one skilled in the art will understand that the teachings herein can be used in other applications as well such as, but not limited to, heat shields for any external engine component. It is therefore intended that the scope of the invention not be limited by the embodiments presented herein as the best mode for carrying out the invention, but that the invention include all embodiments falling within the spirit and scope of the appended claims as well.

The invention claimed is:

1. A combination of a heat shield and a gearbox of a gas turbine engine, the heat shield comprising:
   a barrier adapted to be positioned between the gas turbine engine and the gearbox, the barrier being complementarily shaped to the shape of the gearbox; and
   a plurality of connectors mounting the heat shield to the gearbox, wherein the heat shield comprises a thermal insulation core and at least one metal sheet surrounding the thermal insulation core and wherein the combination is secured to a diffuser case surrounding a diffuser and a combustor of the gas turbine engine such that the heat shield is positioned between the gearbox and the diffuser case.

2. The heat shield and gearbox of claim 1, wherein each connector is welded to the barrier.

3. The heat shield and gearbox of claim 2, wherein each connector is bolted to the gearbox.

4. The heat shield and gearbox of claim 1, wherein the at least one metal sheet is chromium nickel stainless steel.

5. The heat shield and gearbox of claim 1, wherein the insulation core is low-conductivity fiber felt insulation.

6. A combination of a heat shield for a gearbox of a gas turbine engine and the gearbox thereof, the heat shield comprising:
   a barrier adapted to be positioned between the gas turbine engine and the gearbox, the barrier being complementarily shaped to the shape of the gearbox; and
   a plurality of connectors mounting the heat shield to the gearbox, wherein the heat shield comprises a thermal insulation core and at least one metal sheet surrounding the thermal insulation core, wherein the heat shield includes a body having a longitudinal axis, a first leg extending from the body in a first direction perpendicular to the longitudinal axis and forming a first angle between the body and the first leg, and a second leg extending from the body in a second direction opposite to the first direction and forming a second angle between the body and the second leg.

7. The heat shield and gearbox of claim 6, wherein the heat shield further includes a foot extending from the second leg in the second direction forming a third angle between the second leg and the foot.

8. The heat shield and gearbox of claim 6, wherein the second angle is greater than the first angle.

9. A gas turbine engine, comprising:
   a gearbox operatively associated with the engine and mounted outside of an engine core component;
   a heat shield formed to the shape of the gearbox, the heat shield being mounted to the gearbox by a plurality of connectors and being positioned between the gearbox and said core component, wherein the heat shield comprises a thermal insulation core and at least one metal sheet surrounding the thermal insulation core;
   a diffuser located between a compressor and a combustor of the gas turbine engine;

a diffuser case surrounding the diffuser and the combustor, wherein the gearbox is positioned around the diffuser case and the heat shield is positioned between the gearbox and diffuser case.

10. The gas turbine engine of claim 9, wherein the heat shield includes a body, a first leg extending from the body in a circumferential direction around the diffuser case, and a second leg extending from the body away from the diffuser case.

11. The gas turbine engine of claim 10, wherein the heat shield further includes a foot extending from the second leg away from the diffuser case.

12. The gas turbine engine of claim 9, wherein each connector is welded to the heat shield and bolted to the gearbox.

13. A method of limiting an amount of heat transferred to a gearbox of a gas turbine engine, comprising:
   aligning a heat shield with a gearbox such that the shape of the heat shield is complementary with the shape of the gearbox, wherein the heat shield comprises a thermal insulation core and at least one metal sheet surrounding the thermal insulation core;
   mounting the heat shield to the gearbox; and
   mounting the gearbox to the engine, wherein the heat shield is positioned between the gearbox and a diffuser case of the engine the diffuser case surrounding a diffuser and a combustor of the gas turbine engine.

14. The method of claim 13, further comprising welding a plurality of connectors to the heat shield prior to mounting the heat shield to the gearbox.

15. The method of claim 14, wherein the mounting of the heat shield to the gearbox comprises bolting the heat shield to the gearbox.

16. The method of claim 14, wherein the aligning of the heat shield of the gearbox comprises positioning the heat shield such that all surfaces of the gearbox which will face the engine are covered by the heat shield.

* * * * *